United States Patent [19]

Winterbotham

[11] 4,375,593
[45] Mar. 1, 1983

[54] SWITCHING APPARATUS FOR LOAD MATCHING OF WIND-DRIVEN ELECTRICAL GENERATORS

[76] Inventor: Harold Winterbotham, Fern Howe, Braithwaite, Keswick, Cumbria CA12, England

[21] Appl. No.: 284,214

[22] Filed: Jul. 17, 1981

[51] Int. Cl.³ .............................................. H02J 3/14
[52] U.S. Cl. ...................................................... 307/37
[58] Field of Search ..................................... 307/36–38, 307/113, 115, 11, 32, 31, 71

[56] References Cited

U.S. PATENT DOCUMENTS

| | | | |
|---|---|---|---|
| 669,362 | 3/1901 | Emmott | 307/37 UX |
| 877,576 | 1/1908 | Lincoln | 307/37 X |
| 1,469,736 | 10/1923 | Sullivan | 307/113 X |
| 1,677,027 | 7/1928 | Constantin | 307/32 |
| 2,483,281 | 9/1949 | Herr | 307/115 |
| 3,872,371 | 3/1975 | Williams | 307/36 X |

*Primary Examiner*—Donald A. Griffin
*Attorney, Agent, or Firm*—Michael, Best & Friedrich

[57] ABSTRACT

Switching apparatus for matching an electrical load to the voltage output of a wind-driven generator in which the loads are an even number of batteries or electrolytic cells (16). The apparatus includes switching units (10) each having four terminals. Each switching unit has two switching states A and B, the odd numbered switching units (10a, 10c etc.) having pairs of batteries or cells connected between first and third, and second and fourth terminals so that when the switching unit is in State A, the batteries are in parallel and when in state B they are in series. The even numbered switching units (10b etc.) each serve for the interconnection of adjacent pairs of batteries in series or parallel.

Control means is provided which is responsive to the voltage output of the generator for effecting a switching sequence at given voltage threshold to enable the batteries to be switched progressively from a parallel arrangement to a series arrangement as the output voltage from the wind-driven generator increases from a minimum to a maximum.

18 Claims, 6 Drawing Figures

SWITCHING APPARATUS FOR LOAD MATCHING OF WIND-DRIVEN ELECTRICAL GENERATORS

The present invention relates to apparatus for load matching of a wind-driven electrical generator and in particular to switching apparatus for charging batteries and electrolytic applications of wind-driven electrical generators.

The control of wind-power systems is complicated by the variability of the energy source and the need for the wind turbine to operate at variable speed if good wind energy/electrical energy conversion is to be obtained.

The aim of the system designer is therefore to ensure that whatever the wind speed the wind turbine is loaded just sufficiently to keep it running at the optimum speed.

It is known from the disclosure in U.S. Pat. No. 1,638,478 to switch five pairs of batteries either in series or in parallel in a battery charging apparatus. U.S. Pat. No. 2,148,804 discloses a wind-driven generator and a switching system for adding batteries in series in response to increase in speed of the windmill blade. Other battery switching circuits are known.

However all the above known systems suffer from the disadvantage that the loads are not matched to the output of the generator over a very wide range of wind speeds.

The above is particularly so for loads consisting of secondary batteries or electrolytic cells. Such batteries and cells have a relatively fixed "back-EMF" per cell, for example: about 2 to 2.4 volts for lead acid batteries and 1.7 volts for water cells for the electrolytic production of hydrogen and oxygen. This back-EMF opposes the applied voltage. The input power usefully converted to chemical energy is equal to the back-EMF multiplied by the current passing through the cells. The energy wasted in heat is equal to the same current squared multiplied by the resistance of the circuit. The total power input is the sum of these two quantities.

The problem is to relate the variable applied input voltage from the wind-driven generator to the fixed back-EMF of the cells so as to maintain good conversion efficiency, that is, a good ratio of useful power (as defined above) to total power, and at the same time to ensure that the load presented varies in such a way as to keep the wind turbine running at or near its optimum speed.

Loads consisting of batteries or cells must always include resistance, the minimum being the resistance of the generator, the rectifier if any, and the internal resistance of the cells themselves. Such resistance should be kept to a minimum. The characteristics of the load depend on the ratio of applied input voltage to back-EMF and on this series resistance.

In the following discussion V is defined as the total series back-EMF (a D.C. quantity) and E as the EMF of the generator (D.C. or peak to zero A.C.), which is assumed to be represented by a source of EMF in series with a resistance.

It may be shown that in a circuit comprising a source of EMF, a battery or cell and a series resistance:

(a) the efficiency (the ratio of power usefully absorbed in the cell to the total input power) varies nearly linearly (exactly so in the case of D.C.) from zero at $V/E=0$ to unity at $V/E=1$. However, as this latter condition is approached the useful and total powers are both tending to zero. Optimum power transfer to the cells occurs around $V/E=0.5$ for D.C. and 0.25 to 0.3 for A.C. (depending on the waveform). Acceptable ranges of V/E are approximately
D.C. . . . 0.3 to 0.7
A.C. . . . 0.15 to 0.5.

(b) the effective load resistance (defined as the EMF across the load terminals divided by the resultant current) varies from the actual resistance at $V/E=0$ to infinity at $V/E=1$. Over a limited range of about 2:1 in applied EMF, and therefore in V/E if V is assumed constant, the effective resistance varies approximately inversely as the EMF.

This characteristic is well suited to windpower applications. The power output from a wind turbine running at variable speed and optimum wind conversion efficiency is usually proportional to the cube of its rotational speed. If the generator has a linear speed/voltage characteristic over the range of interest the load presented by the cell circuit will also vary as the cube of the speed and can therefore be made to match the cubic law of the wind prime mover.

The range of V/E over which the inverse law is approximately followed is
D.C. . . . 0.3 to 0.7
A.C. . . . 0.2 to 0.4.
The median values are
D.C. . . . 0.5
A.C. . . . 0.3 (with minor variations due to differing waveforms).

The corresponding ranges of efficiency (as previously defined) are
D.C. . . . 30% to 70% (median 50%)
A.C. . . . 21.1% to 35.7% (median 28.9%).

These ratios are independent of resistance. The resistance does however determine the magnitude of the power taken by the circuit for a given EMF.

Considering the points (a) and (b) referred to above it will be seen that reasonable efficiency and load matching to a cubic law prime mover can both be achieved by a careful choice of V/E, but only over a limited range of about 2:1 in V/E. If E varies by more than 2:1, as will often be the case, then V must be changed. This can only be effected by on-load switching so as to alter the number of cells in series across the input.

It is preferable to keep all cells in circuit at all times and if possible to ensure that all take an equal share of the available power. This consideration rules out simple tap-changer systems.

To complete the theoretical exposition, it may be noted that in order to equalize the input power on the two sides of a switching point, and thus to avoid a power discontinuity, the series resistance in circuit must also be switched in an inverse manner (the higher the applied EMF the lower the series resistance). The lowest resistance will usually be taken to be the unavoidable resistances of generator, cells and rectifiers (if any). The values of the resistances to be switched in at lower applied EMFs can readily be calculated for a given case from the equality condition. The effect is to make the power absorbed proportional to the cube of the applied EMF, exactly in the D.C. case at the switching points and approximately elsewhere.

According to the present invention there is provided switching apparatus for matching an electrical load to the voltage output of a wind-driven generator, said apparatus including means for switching an even number of equal electrical loads into any one of all the possible series and/or parallel combinations possible.

In a preferred form the number of loads is equal to $2^n$, n being a positive integer greater than 1.

The switching apparatus may include control means responsive to the voltage output of the generator for effecting a switching sequence at given voltage thresholds whereby said $2^n$ loads are progressively switched from a parallel arrangement to a series arrangement as the output voltage increases from a minimum to a maximum value and vica versa.

The electrical loads may be either batteries or electrolytic cells for producing hydrogen and oxygen.

Thus a load consisting of eight batteries or electrolytic cells which can be switched into any configuration from all in parallel to all in series will in general cover an input power ratio of at least $8^3$ or 512:1. This will be adequate in many wind power applications. The efficiency and effectiveness of the load matching will improve as the number of switched ranges is increased. The eight cell case can be covered in four ranges, namely one cell, two cells, four cells and eight cells in series, using the 2:1 range of V/E. A larger number of ranges, corresponding to a smaller variation in V/E in each range, would improve performance at the cost of additional switching apparatus.

The present invention will now be described in greater detail by way of examples with reference to the accompanying drawings, wherein.

Figures 3, 5:
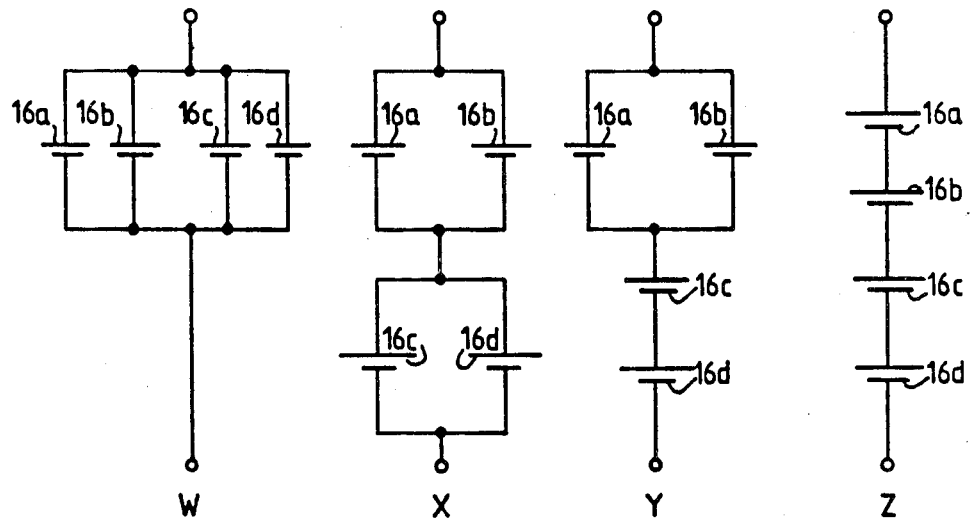
FIG. 3 shows four circuit diagrams representing the four possible modes of connection of the four batteries across the output of the wind driven generator.
Figure 4:
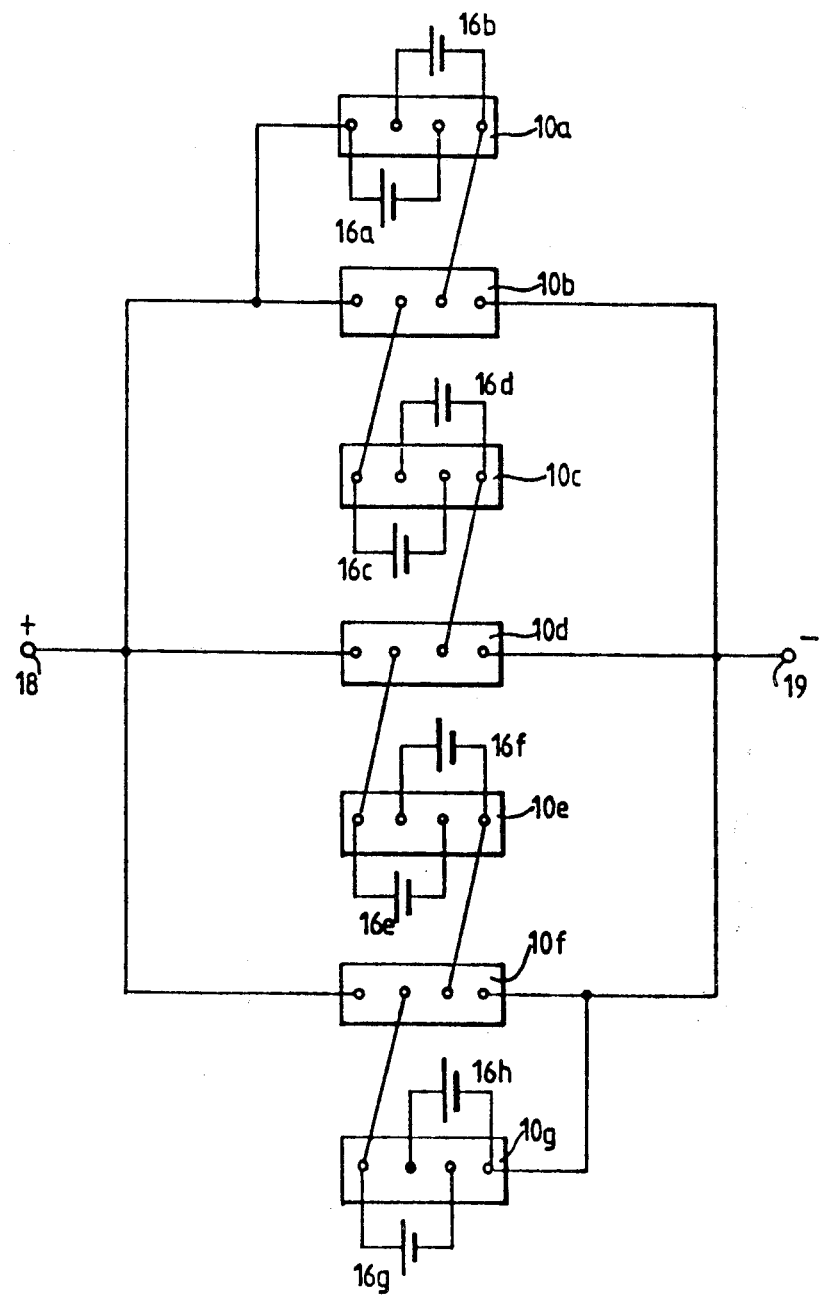
FIG. 4 is a circuit diagram of the switching apparatus designed to charge eight batteries or electrolytic cells by a wind-driven electrical generator.
Figure 6:
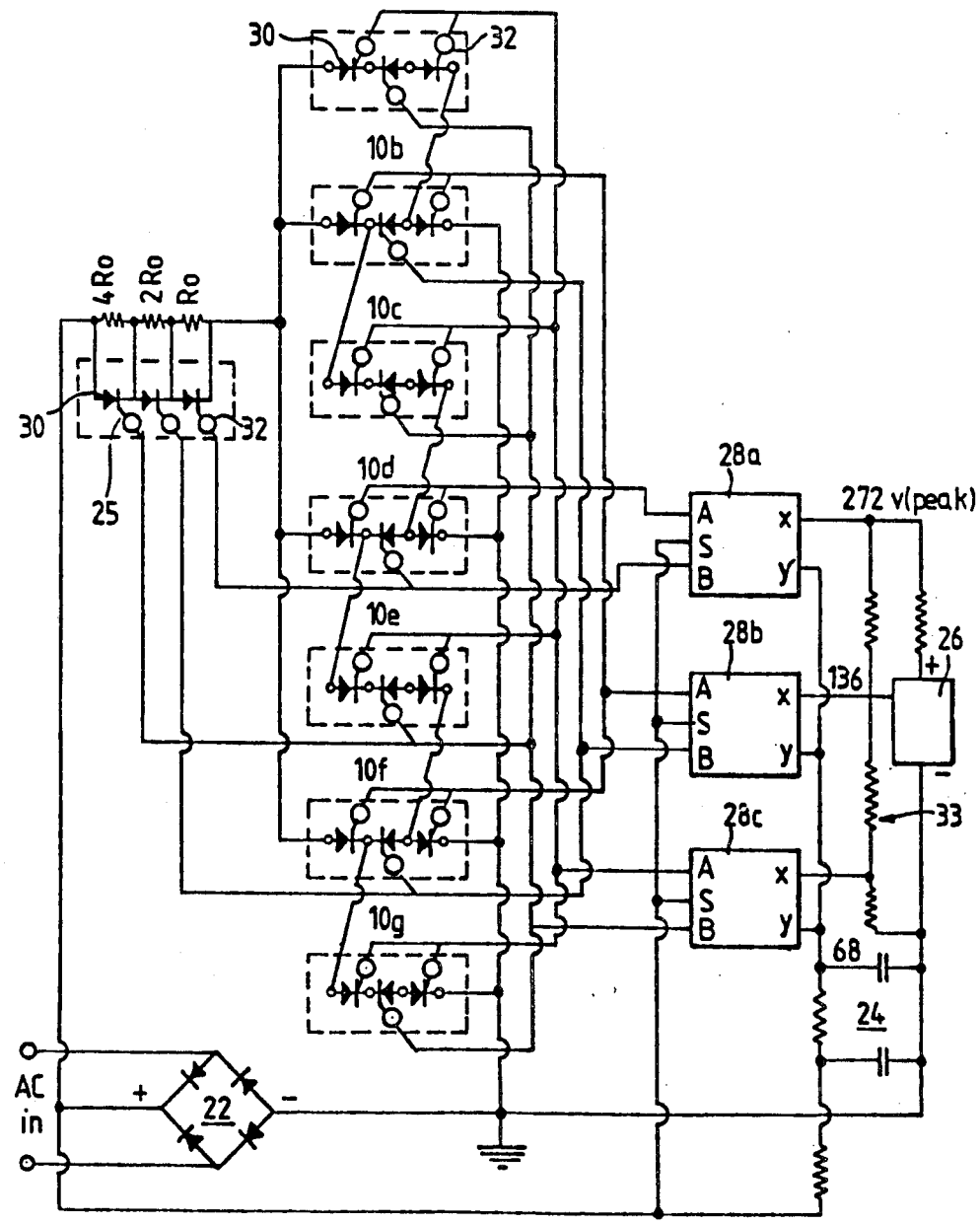

FIG. 5 is a table which explains the states of the seven switches employed in relation to the number of cells connected in series for the switching apparatus shown in FIG. 4; and FIG. 6 is a detailed circuit diagram of a switching apparatus including the control circuits which enable eight groups of electrolytic cells to be switched into one of eight series/parallel combinations according to the power output available from the wind-driven electrical generator.

Figure 1:
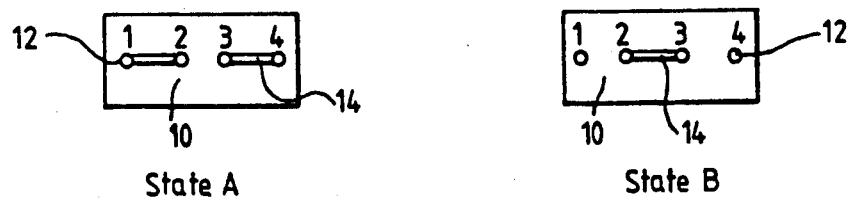
FIG. 1 is a diagrammatic view of a switch unit forming part of a switching apparatus for load matching four batteries or electrolytic cells to be charged by a wind-driven electrical generator, the same switch being shown in its two states A and B respectively.

Referring first to FIG. 1, a switch unit 10 has four terminals 12 (marked 1 to 4) and internal switching means diagrammatically represented by the reference numeral 14 to enable interconnection of the terminals such that in a first state A, the terminals 1 and 2 are bridged and the terminals 3 and 4 are bridged, whilst in a second state B only the terminals 2 and 3 are bridged.

The interconnection of the terminals may be either mechanical by means of a sliding contact bar, or it may be done by electronic devices, such as solid state devices of the thyristor type. The latter alternative is included in the detailed control circuit arrangement shown in FIG. 6.

Figure 2:
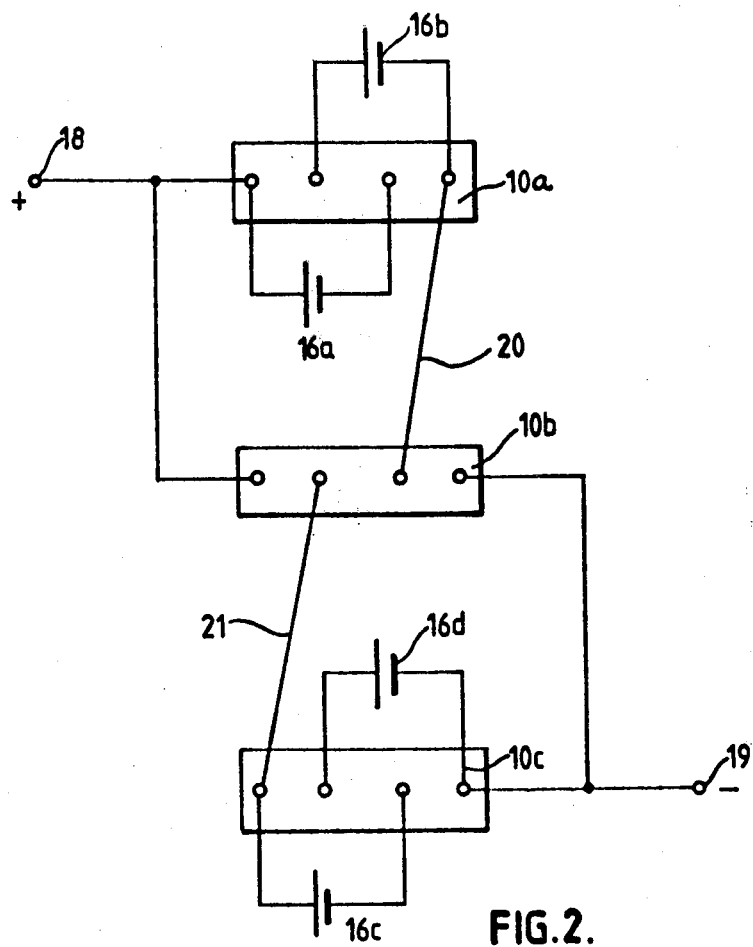
FIG. 2 is a circuit diagram of one preferred form of switching apparatus and its interconnection with four batteries to be charged by a wind-driven electrical generator.

Referring now to FIG. 2, the switching apparatus for interconnecting four batteries 16a to 16d comprises three switch units 10a, 10b and 10c of the type shown in FIG. 1. The A.C. output from the wind-driven generator is rectified by a full wave rectifier bridge (not shown) and applied to positive and negative terminals 18 and 19 respectively.

Battery 16a is connected across the first and third terminals of the switch unit 10a whilst the battery 16b is connected across the second and fourth terminals. Likewise battery 16c is connected across the first and third terminals of the switch unit 10c whilst the battery 16d is connected across the second and fourth terminals.

The positive terminal 18 is connected to the first terminals of switch units 10a and 10b and the negative terminal 19 is connected to the fourth terminals of switch units 10c and 10b. The fourth terminal of switch unit 10a and the third terminal of switch unit 10b are interconnected by a lead 20. Likewise the first terminal of switch unit 10c and the second terminal of switch unit 10b are interconnected by a lead 21. It should be noted that the second switch unit 10b although identical in construction to the other two has a different function. In the first state A it connects the two batteries 16a and 16b associated with the first switch unit 10a in parallel with the two batteries 16c and 16d associated with the third switch unit 10c across the terminals 18 and 19. In the second state B it connects these two sets of batteries in series across the teminals 18 and 19.

Referring now to FIG. 3, it will be seen that there are four possible cases for connecting the four batteries in series/parallel arrangements. In the first case W, the three switches are all in their first state A so that the four batteries are all in parallel.

In the second case X, the first and third switches 10a and 10c are in the first state A, whilst the second switch 10b is in the second state B, in order to provide two parallel circuits connected in series across the terminals 18 and 19. It should be noted that a similar result could be achieved by the second switch 10b being in the first state A whilst the other two switches are in the second state B.

In the third case Y, the first switch 10a is in the first state A, whilst the other two switches are in the second state B. In this case the batteries 16a and 16b are connected in parallel, and the batteries 16c and 16d are connected in series with one another and which the parallel circuit of the batteries 16a and 16b. The alternative switching position BBA connects the batteries 16c and 16d in parallel, and the batteries 16a and 16b in series with one another and in series with the parallel circuit of batteries 16a and 16b.

In the fourth case Z, the three switches are all in their second state B so that the four batteries are all in series.

Referring now to FIG. 4, the switching apparatus for interconnecting eight batteries 16a to 16h comprises seven switch units 10a to 10g of the type shown in FIG. 1. As will be seen, the switch units 10a 10c, 10e and 10g are associated with respective pairs of batteries 16a/16b, 16c/16d, 16e/16f and 16g/16h, in similar manner to the arrangement shown in FIG. 2. The switch units 10b, 10d and 10f are not associated directly with any of the batteries and are similar to the second switch unit 10b of FIG. 2.

The positive terminal 18 is connected to the first terminals of the switch units 10a, 10b, 10d and 10f, whilst the negative terminal 19 is connected to the fourth terminals of the switch units 10b, 10d, 10f and 10g. The second terminals of switch units 10b, 10d and 10f are connected to the first terminals of respective switch units 10c, 10e and 10g. Likewise the third terminals of switch units 10b, 10d and 10f are connected to the fourth terminals of respective switch units 10a, 10c and 10e.

The eight possible circuit arrangements of the eight batteries 16a to 16h is shown diagrammatically in FIG. 5, where the switch states A or B of the seven switch units 10a to 10g are displayed for the eight possible arrangements of batteries connected in series across the terminals 18 and 19. In the first case where all the batteries are in parallel, all the switches are in their first state A, whilst in the eighth case where all the batteries are in series, all the switches are in the second state B.

It should be noted that if all these states are required the switch units must be moved, either mechanically or electrically, in the sequence indicated.

If only the arrangements giving 1, 2, 4 and 8 batteries in series are required, in passing from the eighth battery in series configuration downwards the switches 10a, 10c, 10e and 10g are operated together by mechanical linkage or electrical interconnections, followed by the switch 10d and finally by the switches 10b and 10f.

In this case a given switch only moves once during the transitions from one extreme to the other. It will be noted however that to obtain three batteries in series the two switches 10c and 10g must operate three times.

A more fully detailed circuit diagram of a typical control circuit is shown in FIG. 6. In this case each unit cell 16 consists of eight electrolytic cells in series, a total back-EMF of 13.6 volts. The input from the wind-driven A.C. generator is rectified A.C. of triangular waveform. The V/E ratio varies from 0.2 to 0.4 in each of the four switched ranges. The total range of applied EMF is therefore 34 to 544 volts peak (19.6 to 314 volts RMS). The resistance ratio is found to be very close to 2:1.

The switching sequence in this case is not the same as that illustrated in FIG. 5, the sequence of operation of switches 10b and 10f together, and the switch 10d being reversed. The sequence of FIG. 5 is only required if all the cell arrangements are to be used.

The control circuit in FIG. 6 includes a bridge rectifier 22 a resistance/capacitance smoothing circuit 24, a resistance switch 25, a source of reference voltage 26 of about 300 volts; and trigger units 28a, 28b and 28c.

The resistance switch 25 has first, second and third resistors, having resistance values of $R_o$, $2R_o$ and $4R_o$ respectively ($R_o$ being the internal resistance of all eight cell units in series).

The electrical connecting means within the switch units 10 and the resistance switch 25 are thyristors 30 of the Silicon Controlled Rectifier (SCR) type. As is well known in the art, these semiconductor devices conduct in one direction only. Conduction must be initiated by a trigger pulse applied to the control electrode, and thereafter continues, the trigger having no further control, until the applied voltage is removed.

The input falls to zero twice in a cycle and at these times the SCRs extinguish. The desired SCRs are then triggered on. The process is repeated each half cycle. When the two outer SCRs in the switch units 10 are triggered the switch unit remains in the first state A. When the centre SCR is triggered (but not the two outer SCRs) the switch unit changes to the second state B. When one of the SCRs in the resistance switch 25 is being triggered the associated resistor is short-circuited.

Each SCR 30 has its own individual trigger pulse generator 32, which are in turn connected to the main trigger units 28a, 28b and 28c via capacitors (not shown) as they are at various different D.C. potentials.

The identical trigger units 28a, 28b and 28c provide trigger pulses synchronized from the input at terminal S on either the terminal A or B. When the D.C. potential on their terminal X exceeds that on Y the trigger pulses are produced on the terminal A and when the potential on the terminal Y exceeds that on X, the trigger pulses are produced on the terminal B.

The potentials on the terminals X are provided by the source of reference voltage 26 and a potential divider 33. The potential on the terminals Y is supplied from the input waveform, rectified by the bridge circuit 22, smoothed by the circuit 24 and is therefore approximately equal to the peak of the applied EMF.

The operation of the control circuit will now be evident. If the applied EMF is below 68 volts peak all cell units 10 are in parallel. As this peak voltage is exceeded the trigger unit 28c changes over and provides a trigger pulse at its terminal B. Switch units 10a, 10c, 10e and 10g are changed to the second state B thus putting their associated cell units in series. The resistance switch 25 shorts out the third resistor having a resistance value of $4R_o$ thus having the series resistance.

If the applied EMF exceeds 136 volts peak the trigger unit 28b changes over and provides a trigger pulse at its terminal B. Switch units 10b and 10f change to the second state B, thus placing the two groups of cells directly connected to them in series. The second resistor having a resistance value of $2R_o$ is shorted out, thus reducing the total series resistance to $2R_o$ ($R_o$ connected in the resistance switch 25 and $R_o$ in the circuit). Similarly if the applied EMF rises to 272 volts peak the trigger unit 28a changes over and provides a trigger pulse at its terminal B. Switch unit 10d changes to the second state B. The first resistor having a resistance value of $R_o$ is shorted out and since all cell units are now in series, the total resistance is $R_o$.

A reverse process takes place as the applied EMF is reduced.

It will be appreciated that there are other possible arrangements of this circuit. For example, the bridge rectifier 22 could be omitted because the SCRs 30, being unidirectional, will act as rectifiers. However, in such an arrangement the circuit shown in FIG. 6 would only allow current to flow to the cells 16 on one half-cycle. A second set of switch units and cells would be necessary to take the other half-cycle of the input.

Other methods of employing the switch units system may readily be devised. For example, a sliding or rotating mechanical switch could be used. In the case illustrated in FIG. 6, this actuating switch would have four positions:

Position 1: All switch units in the first state A.
Position 2: Switch units 10a, 10c, 10e and 10g to the second state B.
Position 3: As position 2, and switch units 10b and 10f to the second state B.
Position 4: As position 3, and switch unit 10d to the second state B. (All switches now in the second state B).

The switching motion would be controlled by a voltage sensitive relay and actuated by a latching motion in a way well known in the art.

I claim:
1. Switching apparatus for matching an even number of equal electrical loads to the voltage output of a wind-driven generator, said switching apparatus comprising means for switching the even number of electrical loads into series and/or parallel combinations and control means coupled to said switching means and responsive to the voltage output of the generator for effecting a switching sequence at given voltage thresholds whereby the loads are progressively switches from a parallel arrangement to a series arrangement as the output voltage increases from a minimum to maximum value and the loads are progressively switched from a series arrangement to a parallel arrangement as the output voltage decreases from a maximum to a minimum value.

2. Switching apparatus in accordance with claim 1 wherein said switching means comprises $2^n-1$ switching units, n being a positive integer greater than one, each switching unit having four terminals, and two switching states, a first state in which the first and second terminals are interconnected and the third and fourth terminals are interconnected, and a second state in which the second and third terminals are interconnected.

3. Switching apparatus according to claim 2, wherein $2^n-n$ of the switching units each have a pair of loads connected respectively across the first and third terminals and second and fourth terminals.

4. Switching apparatus according to claim 3, wherein the n other switching units have the first and fourth terminals connected to the terminals of the output from the generator, and second and third terminals connected to adjacent switching units of the $2^n-n$ switching units.

5. Switching apparatus according to claim 2, wherein said switching means further comprises thyristors connected between the first and second terminals, the second and third terminals and the third and fourth terminals of each switch unit, said thyristors having control electrodes connected to said control means.

6. Switching apparatus according to claim 5, wherein said thyristors are silicon controlled rectifiers.

7. Switching apparatus according to claim 5, wherein said control means comprises trigger circuits and associated voltage reference means, said trigger circuits responsive to a number of different voltage levels to progressively effect said switching.

8. Switching apparatus for matching an electrical voltage output of a wind-driven generator, comprising an even number of equal electrical loads, means for switching said even number of electrical loads into series and/or parallel combinations and control means responsive to the voltage output of the generator for effecting a switching sequence at given voltage thresholds whereby said loads are progressively switched from a parallel arrangement to a series arrangement as the output voltage increases from a minimum to a maximum value and said loads are progressively switched from a series arrangement to a parallel arrangement as the output voltage decreases from a maximum to a minimum.

9. Switching apparatus in accordance with claim 8, wherein said switching means is operative for switching said even number of equal electrical loads into any one of all the possible series and/or parallel combinations.

10. Switching apparatus according to claim 8, wherein said loads are electrical batteries.

11. Switching apparatus according to claim 8, wherein said loads are electrolytic cells for producing hydrogen and oxygen.

12. Switching apparatus according to claim 8, wherein the number of loads is equal to $2^n$, n being a positive integer greater than 1.

13. Switching apparatus according to claim 12, wherein said switching means comprises $2^n-1$ switching units, each switching unit having four terminals, and two switching states, a first state in which the first and second terminals are interconnected and the third and fourth terminals are interconnected, and a second state in which the second and third terminals are interconnected.

14. Switching apparatus according to claim 13, wherein $2^n-n$ of the switching units each have a pair of loads connected respectively across the first and third terminals and the second and fourth terminals.

15. Switching apparatus according to claim 14, wherein the n other switching units have the first and fourth terminals connected to the terminals of the output from the generator, and second and third terminals connected to adjacent switching units of the $2^n-n$ switching units.

16. Switching apparatus according to claim 13, wherein, said switching means further comprises thyristors connected between the first and second terminals, the second and third terminals and the third and fourth terminals of each switch unit, said thyristors having control electrodes being connected to the control means.

17. Switching apparatus according to claim 16, wherein said thyristors are silicon controlled rectifiers.

18. Switching apparatus according to claim 16, wherein said control means comprises trigger circuits and associated voltage reference means, said trigger circuits being responsive to a number of different voltage levels to progressively effect said switching.

* * * * *